Jan. 19, 1954  E. V. BERGSTROM  2,666,731
METHOD AND APPARATUS FOR HYDROCARBON CONVERSION
Filed Feb. 12, 1949  2 Sheets-Sheet 1

INVENTOR.
ERIC V. BERGSTROM
BY John A. Crowley, Jr.
AGENT OR ATTORNEY

Jan. 19, 1954  E. V. BERGSTROM  2,666,731
METHOD AND APPARATUS FOR HYDROCARBON CONVERSION
Filed Feb. 12, 1949  2 Sheets-Sheet 2
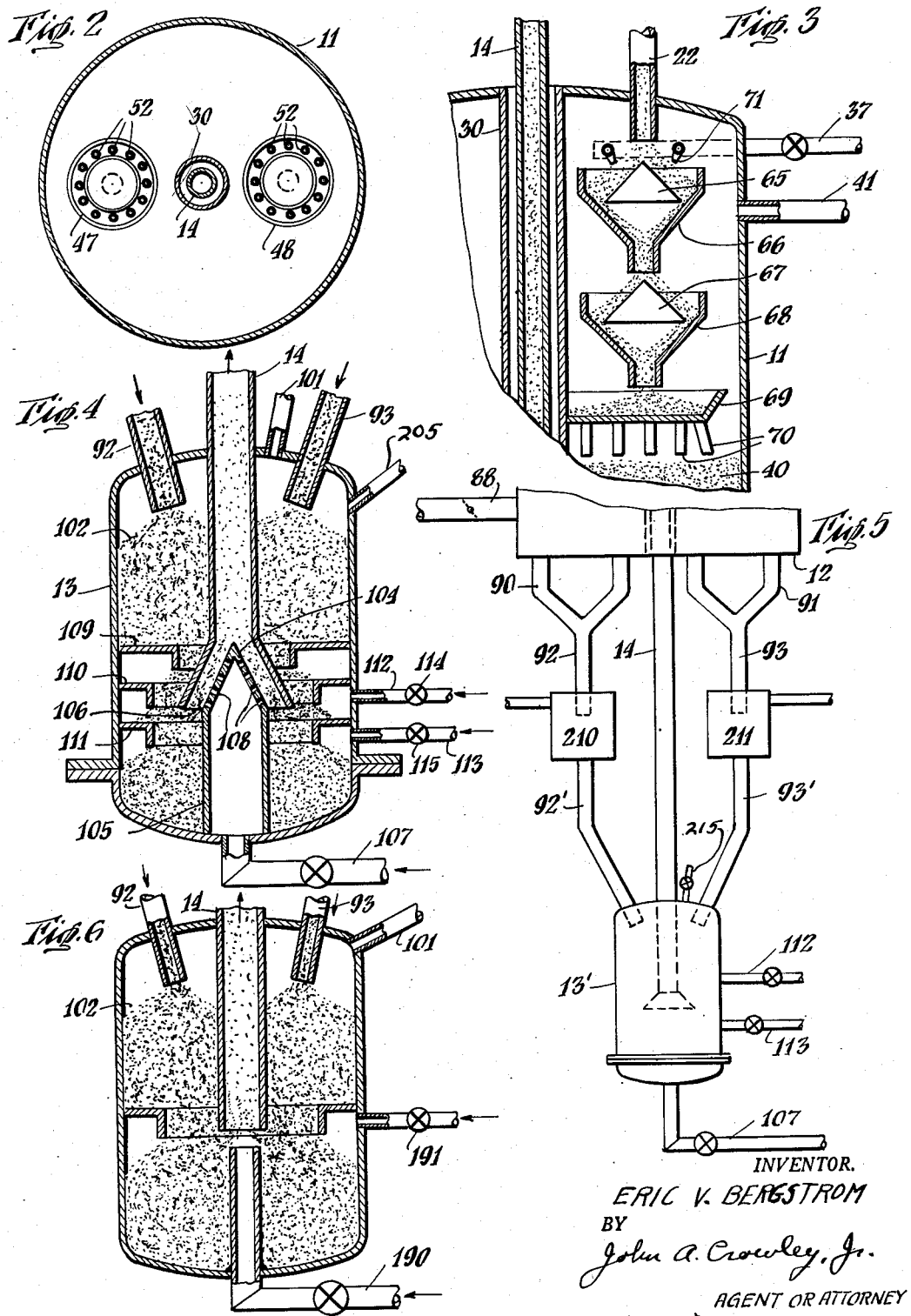
INVENTOR.
ERIC V. BERGSTROM
BY
John A. Crowley, Jr.
AGENT OR ATTORNEY Patented Jan. 19, 1954

2,666,731

UNITED STATES PATENT OFFICE 2,666,731

METHOD AND APPARATUS FOR HYDROCARBON CONVERSION

Eric V. Bergstrom, Short Hills, N. J., assignor to Socony-Vacuum Oil Company, Incorporated, a corporation of New York Application February 12, 1949, Serial No. 76,017

15 Claims. (Cl. 196—52)

This invention pertains to processes for conversion of fluid hydrocarbons in the presence of a granular contact material which may or may not be catalytic in nature. Typical of the processes to which this invention pertains are the catalytic cracking conversion, isomerization, hydrogenation, reforming, dehydrogenation aromatization, hydroforming, treating and desulfurization of petroleum fractions. Also typical are the coking, viscosity reducing of petroleum residuums and high temperature pyrolytic conversion processes such as the conversion of propane and ethane to ethylene or of methane to acetylene. In these latter processes the granular contact material serves merely as a heat carrying material.

An important commercial unit for continuously conducting reactions of this type is one wherein the granular contact material is passed cyclically through a hydrocarbon conversion and a contact material reconditioning zone in which it flows downwardly as a substantially compact column. The contact material employed in such a process may be a catalyst in the form of natural and treated clays, bauxites, inert carriers impregnated with certain catalyst active metallic oxides or synthetic associations of silica, alumina, magnesia or of combinations thereof to which may be added small amounts of metallic oxides for specific purposes. When the contact material is employed for heat carrying purposes only it may take the form of metal balls, capsules containing fusible alloys, pebbles, carborundum, mullite, zirconium oxide, fused alumina and the like. For coking processes the solid material may consist of a low activity clay catalyst, petroleum coke or porous inert material such as pumice. The contact material may be in the form of pellets, spheres, tablets or irregular shaped particles and it should be understood that the term "granular" is employed broadly herein as covering any of the above. The contact material granules may range in size from about one-half inch to 80 mesh Tyler, and preferably should be of the order of 4 to 20 mesh size.

This invention is concerned with an improved system for conducting reactions of the type discussed above in the presence of a cyclically moving granular contact material and particularly with the contact material circulation part of such system.

Heretofore, it has been customary in commercial installations to position the reaction and regeneration vessels side by side and to circulate contact material between the vessels in bucket elevators. Such elevators are unsatisfactory for extremely high temperature operations due to mechanical failure and also impose undesirable practical limitations on the maximum rate of contact material circulation. It has been proposed in the prior art to withdraw contact material from one of the contacting vessels through a throttled outlet pipe from which it passes into a high pressure, high velocity jet of lift gas by which is suspended and lifted to the other contacting zone. Such systems have not been employed in commercial cracking units using granular contact material because of several serious difficulties rising from their use in such processes. The lift gas in such proposed systems is provided by a compressor and due to the very substantial pressure drop across the lift pipe, the power requirements for such lift systems is very high. Also, since there is a substantial pressure at the lower end of the lift stream, a serious problem arises in attempting to introduce the contact material into the lift gas stream, particularly when the contacting zone from which it passes to the lift stream is operating at a low pressure. Another very serious disadvantage of such transfer systems is that the high velocity gas jet which is customarily introduced into the lower end of the gas lift pipe causes serious attrition of the contact material to fines and erosion of the apparatus. Also, while under certain conditions of gas and contact material linear flow velocity, serious attrition of the contact material in the lift pipe itself may be avoided. Such operation cannot be assured in gas lift methods known heretofore because of the fact that they usually depend upon a change in total gas flow rates to effect changes in the amount of contact material being transferred per unit of time. This means that a required change in contact material circulation rate may demand a change to gas velocities in the gas lift stream which are not desirable from a standpoint of contact material attrition. Some prior art gas lifts employing high velocity ejectors depended not only on change in ejection gas velocity to regulate solid transfer rates but also on a change in the spacial relationships of the gas and solid material inlets with respect to each other and with respect to the lower end of the gas lift pipes. Since a large part of the attrition losses may occur in the region of the high velocity jet inlet point, a small change in spacial relationships in this region in gas lifts of the latter type may have a very detrimental effect on contact material attrition rates.

It is a major object of this invention to provide an improved method and apparatus for conducting hydrocarbon conversions in the presence of moving granular contact material.

A specific object is the provision in such a process of a new and improved method and apparatus for accomplishing the contact material circulation and for controlling its rate.

Another object is the provision of an improved method and apparatus for introducing the contact material into a gas lift stream which will make practically possible the circulation of granular contact material in continuous catalytic cracking system by means of pneumatic transfer.

These and other objects of this invention will become apparent in the following discussion.

According to one form of this invention, contact material is passed downwardly through two contacting zones, arranged one above the other, one of said zones being the hydrocarbon conversion zone and the other zone being the contact material reconditioning zone. The contact material is passed downwardly by gravity flow from the lower contacting zone as a compact stream delivering onto a compact bed of contact material in a lift feed zone. A lift pipe extends upwardly from within said bed to a separation zone which is located above the upper contacting zone. The downwardly facing lower end of the lift pipe is open across at least part of its cross sectional area to said bed. A first stream of lift gas is passed upwardly into the lower end of the lift pipe without causing it to pass through any substantial depth of contact material bed. A feeder stream of lift gas is caused to pass through a substantial portion of the bed and then into the lower end of the lift pipe so as to push or induce the contact material from the bed to flow into the first upwardly flowing lift gas stream. The rate of contact material entry into the lift pipe is controlled by regulation of the amount of feeder gas flow. The lift gas stream may enter the lift pipe under a pressure suitable for effecting the desired contact material transfer but in preferred forms of the invention the lift gas and contact material which has entered the lower end of the lift pipe is sucked upwardly by means of vacuum maintained in the receiving or separation zone. The contact material is separated from the lift gas in the separation zone and passes downwardly through an unobstructed gravity feed leg to the conversion zone. When the contacting vessels are arranged one above the other the rate of contact material downward travel from separation zone all the way down to the lift feed zone is controlled by control of the rate of contact material entry from under the bed in the lift feed zone into the gas lift stream. If the contact material vessels are positioned side by side, two such pneumatic transfer systems are provided.

The invention may be most readily understood by reference to the attached drawings of which Figure 1 is an elevational view, partially in section, showing a preferred arrangement of the entire cyclic conversion system according to this invention;

Figure 2 is a sectional view taken along line 2—2 of Figure 1;

Figure 3 is an elevational view, partially in section showing a modification of a portion of the conversion vessel in Figure 1;

Figure 4 is an elevational view, partially in section showing details of the lift feed tank shown in Figure 1;

Figure 5 is an elevational view showing a modification of part of the arrangement shown in Figure 1; and Figure 6 is a similar view of a modified form of the lift feed tank. All of these drawings are highly diagrammatic in form.

Figure 1:
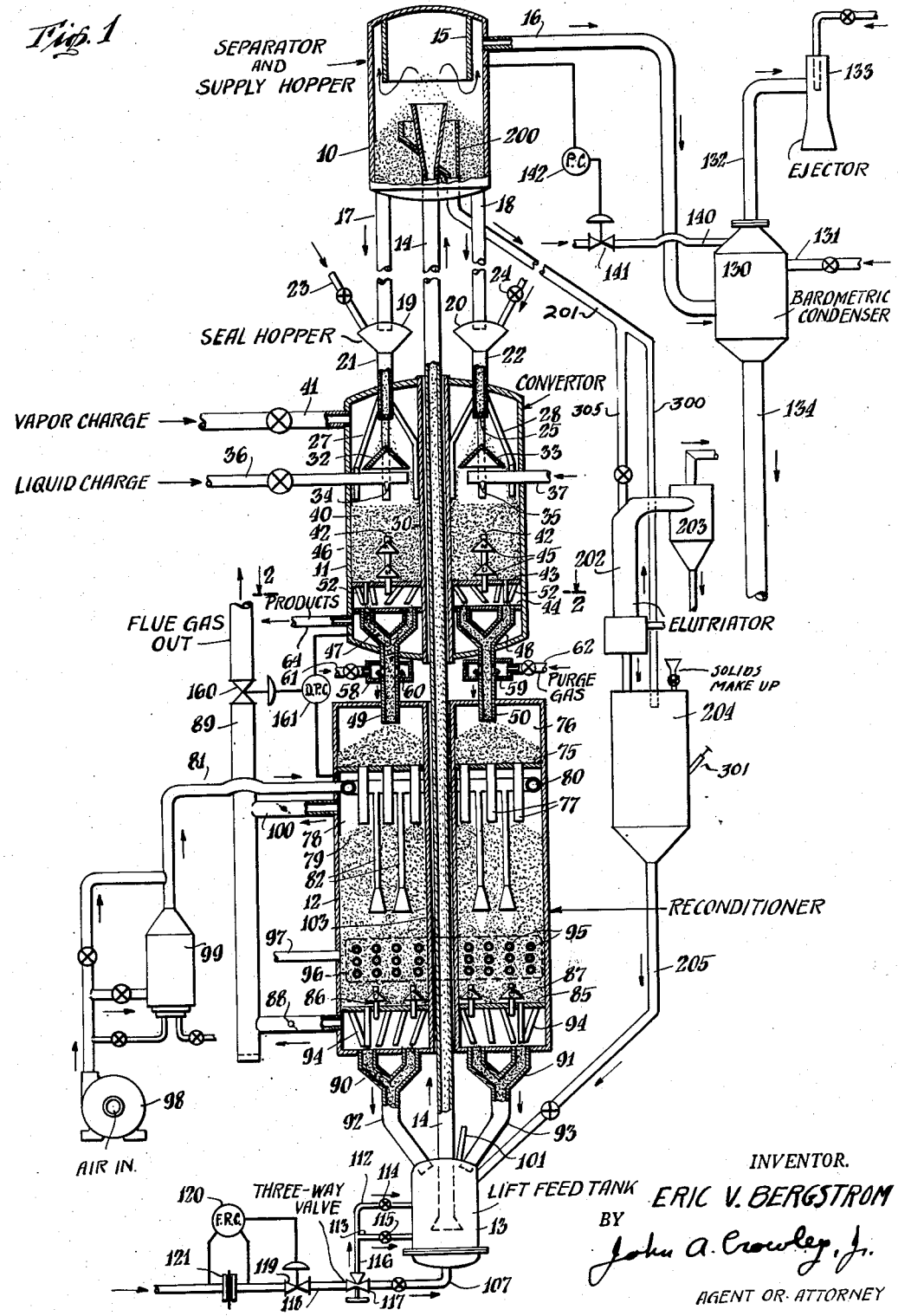

Turning now to Figure 1, we find a supply hopper or separator 10, a convertor 11, a reconditioner 12 and a lift feed tank 13 arranged in vertical series. The separator may be of any desired conventional design, the one shown being of the settling chamber type in which gas and contact material enter upwardly from the flared open end of the lift conduit 14 located intermediate the top and bottom of chamber 10. A cylindrical baffle 15 is suspended from the top of chamber 10 and terminates near the level of gas discharge from the lift conduit. A gas outlet conduit 16 connects through the side of chamber 10 near its top and communicates the upper section of chamber 10 with a barometric condenser 130. Condensing water is supplied to condenser 130 via conduit 131 and non-condensed gas is withdrawn via conduit 132 to an ejector 133. A barometric leg 134 extends downwardly from the condenser to a suitable well not shown. The barometric condenser may be of conventional construction. Two vertical feed leg pipes 17 and 18 extend down from the bottom of chamber 10 to terminate within the upper section of seal hoppers 19 and 20. The feed leg pipes are continued as pipes 21 and 22 down from the bottom of the seal hoppers into the upper section of the convertor 11. Seal gas inlets 23 and 24 connect into the tops of seal hoppers 19 and 20 respectively. The pipes 21 and 22 are closed on their lower ends except for centrally positioned orifices 25 which are of such size as will permit the passage therethrough of only a portion of the total contact materials flow circulation. A number of branch pipes 27 and 28 extend down from the pipes 21 and 22 to a plurality of points uniformly distributed across the cross-section of vessel 11. While only two gravity feed legs are shown it will be understood that any desired number may be employed, for example, four pipes, one in each quadrant may be provided for better contact material distribution.

The convertor 11 shown is circular in horizontal cross-section but may be of any desired shape. A vertical conduit 30 extends centrally through the convertor 11 and its open ends are welded to the top and bottom of the convertor so as to provide a central vertical shaft which extends through the convertor. Within the upper section of the convertor distributing cones are supported by suitable means (not shown) centrally below the pipes 21 and 22 respectively. Spray nozzles 34 and 35 are positioned below the cones 32 and 33 and are mounted on liquid supply pipes 36 and 37 respectively. The spray nozzles are located above the lower ends of pipes 27 and 28 so that the liquid oil charge is sprayed into the shower of contact material falling from the cones 32 and 33 above the surface of the compact bed of contact material 40. A conduit 41 connects into the upper section of vessel 11 for vapor charge.

It will be understood that other suitable arrangements may be provided for contact material and hydrocarbon introduction into the convertor. A modified arrangement is shown in Figure 3 in which like elements bear the same numerals. In the arrangement shown in Figure 3 the pipes 21 and 22 are entirely open on their lower ends, only pipe 22 being shown. Pipe 22 delivers the contact material on cone 65 from which it flows into a funnel 66. The contact material flows then over cone 67 into funnel 68 and finally into pan 69 from which it flows via pipes 70 onto the bed surface. Liquid charge is sprayed from nozzles 71 onto the stream of contact material flowing on the cone 65. In this system the contact material flow is entirely as a compact stream. Such an arrangement is described in detail in United States Patent 2,438,261, issued March 23, 1948.

Across the lower section of vessel 11 there are provided two vertically spaced apart horizontal partitions 43 and 44. A plurality of riser pipes 42 (not being shown) extend up through the upper partition 43. The pipes 42 are uniformly distributed around the partition and are closed only on their upper ends. On each pipe 42 there are attached vertically spaced, inverted, conical shaped collecting cups 45. The undersides of the cups 45 communicate with the interior of pipes 42 through orifices 46. Depending from the lower partition 44 are two annular shaped funnels 47 and 48 which have downspouts 49 and 50 respectively depending from their bottoms. A plan view of these funnels may be seen in Figure 2. A plurality of pipes 52 depend from partition 43 and terminate at a common level just above the annular funnels. The pipes 52 are uniformly distributed across the horizontal cross-sectional area of partition 43 and half of these pipes deliver contact material into funnel 47 while the other half deliver into funnel 48. This arrangement insures uniform flow of contact material through all the pipes 52 since the flow is as a compact stream throttled at a still lower level in the system as will be described hereinafter. The downspouts 49 and 50 deliver the contact material into the upper end of the reconditioner 12. If desired, four sets of funnels and downspouts may be provided instead of two in which case each set is preferably offset 90 degrees from any other set. Purge gas inlet manifold boxes 58 and 59 are provided around the downspouts 49 and 50 and louvers 60 are provided in the downspouts to permit ingress of purge gas. Supply pipes 61 and 62 connect into the manifold boxes 58 and 59 respectively. A vapor outlet conduit 64 connects into the convertor at a level between partitions 43 and 44. Other catalyst withdrawal and purging arrangements may be substituted for the one described. For example, an alternative arrangement which may be employed is described in United States Patent 2,434,202, issued January 6, 1948. When the entire oil charge is in the gaseous phase the reactant flow through the contact material may be upward instead of downward. It is pointed out that the invention is not considered as limited to the particular convertor construction described hereinabove and that other suitable convertor arrangements which are known to the art may be employed within the broadest scope of the present invention.

In the upper section of reconditioner 12 there is provided a horizontal partition 75 which provides an upper chamber 76. A plurality of uniformly distributed pipes 77 depend from partition 75 for contact material flow from the upper chamber and to provide a gas space 78 above the column 79 in the reconditioner. A ring type gas inlet header 80 supplied from conduit 81 is provided in the gas space 78. Tubes 82 depend from the header 80 and terminate in flared lower ends at an intermediate level in the vessel 12. A partition 85 extends across the lower section of vessel 12 and riser pipes 86 similar to pipes 42 in the converter extend upwardly from the space under partition 85 to a level thereabove. Inverted collector cups 87 are provided on pipes 86. A gas outlet conduit 88 communicates the space under partition 85 with a stack 89. Another gas outlet conduit 100 connects between the space under partition 75 and stack 89. Annular shaped funnels 90 and 91 with downspouts 92 and 93 respectively depend from the bottom of vessel 12 and are supplied with solid material from pipes 94 which depend from partition 85. The arrangement is similar to the contact material withdrawal arrangement provided in the converter 11 as described above. Heat transfer tubes 95 are provided at one level along the lower portion of the reconditioner. A suitable heat exchange fluid is supplied to these tubes from a manifold box on one side of the vessel and withdrawn into a second manifold box on the opposite side of the vessel. The inlet manifold box is indicated at 96 and is supplied in turn from inlet conduit 97. Reconditioning gas, for example air, passes from a blower 98 through a suitable line heater 99 and then via conduit 81 to the ring type manifold 80. If desired, the line heater 99 may be by-passed in some operations. It should be understood that the reconditioner described above is only one of a number of possible designs which are particularly adapted for use in operations wherein a catalyst bearing carbonaceous deposits requires regeneration by burning of the deposits. In operations where the purpose of the reconditioner is merely to exchange heat to or from the contact material, its construction may vary considerably from that shown in Figure 1.

The downspouts 92 and 93 deliver contact material into the upper section of the lift feed tank 13 which is vented either to the atmosphere or to a low pressure zone via pipe 101. If desired, depressuring chambers may be provided along the pipes 92 and 93 above the feed tank instead of venting the feed tank. Such an arrangement is shown in Figure 5 in which the pipes 92 and 93 terminate within depressuring chambers 210 and 211. Gas is withdrawn from the tops of these chambers and the contact material flows down through pipes 92' and 93' into the closed lift feed tank 13'. Seal legs of contact material formed in pipes 92' and 93' permit the supply of the feeder stream of lift gas into the top of tank 13' via conduit 215.

The feed tank may be best understood by considering Figure 4 along with Figure 1. A vertical lift conduit extends upwardly from a location within the tank 13, below the bed surface 102 therein through the shafts 103 and 30 in the reconditioner and convertor and up into the separator 10 wherein it termintes at an intermediate level between its ends. The shafts 103 and 30 are of substantially greater diameter than the lift pipe 14 so as to avoid thermal expansion stresses and also so as to permit the substitution of a larger lift pipe should higher circulation rates be required at a future time. The lower end of pipe 14 is flared and the conical roof 104 of a cylindrical inlet header 105 extends centrally up into the flared end of pipe 14 so as to leave an annular passage 106 for contact material entry. The header 105 is connected to the bottom of tank 13 and gas is supplied thereinto through pipe 107. The roof member 104 has numerous perforations 108 therein to permit gas flow into pipe 14. If desired, the roof members may be formed of screens. In the modification shown in Figure 4, the perforations in roof member 104 are all above the flared lower end of the lift pipe so that the gas entering from pipe 107 enters the lift pipe without having to pass through any portion of the bed in the feed tank. Ring shaped angle members 109, 110 and 111 are provided at three levels around the inner periphery of tank 13. Member 109 serves to baffle the contact material flow while members 110 and 111 serve as gas distributors supplied from conduits 112 and 113 respectively. The gas distributor members should be at levels near that of the lower end of pipe 14. Flow control valves 114 and 115 are provided on conduits 112 and 113 respectively and these conduits are connected through conduit 116 to one side of a three-way valve 117. Conduit 107 communicates header 105 with another side of valve 117 and gas is supplied to the third side of valve 117 through conduit 118. A diaphragm operated flow control valve 119 is provided on conduit 118 upstream from valve 117. Valve 119 is actuated by flow rate controller 120 in response to changes in gas flow rate as measured by orifice 121.

In operation, contact material passes downwardly as a substantially compact column through feed legs 17 and 18 to the seal zones 19 and 20 and thence into the convertor 11. The gravity feed legs are long enough to create a head of contact material at their lower ends greater than the pressure differential between the convertor and the supply hopper 10. Steam or flue gas or some other suitable seal gas is admitted into the seal zones so as to maintain an inert gaseous blanket adjacent the lower ends of the feed legs. A portion of the contact material passes through orifices 25 onto cones 32 and 33 then downwardly as a shower onto the surface of column 40. If a liquid charge is being employed it may be sprayed from nozzles 34 and 35 into the shower of contact material. Gasiform charge enters via conduit 41. The remainder of the contact material flows as compact streams through pipes 27 and 28 onto the surface of column 40 and thereby maintain constant the column surface level. In other arrangements such as that shown in Figure 2, the entire contact material feed may be conducted from hopper 10 to column 40 as a compact stream or streams. The fluid reactant is converted to gasiform products which are collected by collectors 45 and withdrawn from the vessel via conduit 64. Used contact material passes as a compact stream or streams from vessel 11 to vessel 12, and then passes through vessel 12 as a compact column of gravitating granules. An inert purge gas is supplied into the pipes 49 and 50 to strip gasiform hydrocarbons from the contact material and to prevent flow of reactant gas between vessels 11 and 12. The purge steam may be withdrawn via conduit 64 along with the gasiform products. A suitable reconditioning gas enters the vessel 12 via conduit 81, header 80 and pipes 82 and then flows in part up through the column 79 to outlet 100 and in part down through column 79 to outlet 88. The reconditioning gas may be merely a heating or cooling gas in the case of pyrolytic processes while it may be an oxygen containing gas suitable for burning carbonaceous deposits from the contact material in the case of most catalytic processes. Additional heat may be added to or removed from column 79 by means of heat transfer tubes 95. Reconditioned contact material flows by gravity as compact streams into the feed tank 13 wherein it is delivered onto the surface of the substantially compact bed 102. The tank 13 is vented at 101 so that the surface of the bed 102 is substantially at atmospheric pressure. Steam is admitted from conduit 118 through valve 117 and conduit 107 into the header 105 and thence it passes through the perforations 108 into the annular type passage 220 leading up to the bottom of the lift pipe 14. The steam may be at a relatively low pressure, near atmospheric since it is sucked up through pipe 14 into the hopper 10 which is maintained under a substantial vacuum. A feeder stream of steam passes from the tree-way valve 117 to pipes 112 and 113 and enters the bed from under distributor 110 and 111 or both and then passes transversely through the bed into the passage 106. This induces or pushes the contact material into the first gas stream which enters the lift pipe without flowing through the bed. This first gas stream imparts to the contact material additional energy required to raise it to a suitable lift velocity. It has been found that the rate of contact material flow from the bed 102 into the lift pipe 14 can be controlled partly or entirely by regulating the rate of flow of the feeder stream. This feeder stream should be introduced preferably at a point or points where it will be forced to flow transversely across the bed in the feed tank in a roughly horizontal direction before it reaches the lift pipe. However, it is contemplated within the broader scope of this invention that the secondary stream may be introduced above the bed surface as via pipe 215 in Figure 5 and then caused to flow down through the bed and into the lift pipe. This latter alternative represents a less preferred form of the invention and when this type of operation is employed the pressure in the feed tank may be above atmospheric by the amount required to force the secondary stream down through the bed in the lift feed tank. Also, in less preferred forms of the invention, the feeder stream of gas may be supplied into the bed at a point or points spaced somewhat below the level of the lower end of the gas lift pipe, but in employing this latter method care should be taken to avoid boiling or substantial fluidization of the bed in the left feed zone. It is preferred to introduce the feeder stream of gas at a location which is not substantially below the level of the lower end of the lift pipe. In any event, the secondary stream should pass through at least a substantial thickness of the compact bed in the feed tank before reaching the lower end of the gas lift pipe. It has also been found to be important to limit the gas and contact material flow on entering the lift pipe to a velocity which is not greatly in excess of that reached by the gas and contact material respectively in the lift pipe thereabove. Thus, it is desirable that the area provided by the perforations 108 be not substantially less than the horizontal cross-sectional area of the lift pipe at a level above its flared lower end. Also, the horizontal cross-sectional area of the annular passage 106 should likewise be of the same order of magnitude as that of the lift pipe above its flared lower end.

A modified form of lift feed tank is shown in Figure 6. In this figure, the lift pipe 14 is not shown to be flared on its lower end and the first gas stream is supplied into tank 13 via conduit 190 which is in line with pipe 14 but which terminates a short distance therebelow so as to provide a vertical gap between pipes 14 and 190 into which contact material is induced or pushed by means of the feeder stream of steam from pipe 191. It has been found that when the vertical gap between the ends of pipes 14 and 190 is sufficiently short the gas flowing up from pipe 190 prevents the formation of any substantial compact bed in the gap so that the gas from pipe 190 actually passes between the ends of pipes 190 and 14 "without having flowed through any substantial thickness of compact bed in the feed zone." It should be understood that the above quoted language and language to similar effect as used herein in describing and claiming this invention is intended to broadly cover the method of Figure 1 where the first gas stream is introduced directly into the lift pipe at a location above its lower end and the method of Figure 6 where the first stream of gas is introduced into the feed zone at a point below and separated from the lower end of the lift pipe by a short gap as described hereinabove. The proper size of the gap depends upon the size of the pipes 14 and 187. As an example, where the pipes 14 and 190 were 10 and 7 inch diameter pipes, a vertical gap of from 2 to 10 inches was found to provide satisfactory operation. In order to insure that the linear velocity of the gas from pipe 190 is not substantially greater than the mixed gas velocity in pipe 14, it is preferred to employ instead of the arrangement shown in Figure 6, the arrangement of Figure 4 modified to the extent of lowering the level of the conical head 104 relative to the lower end of pipe 14 so that all or a portion of the perforated area of the head 104 is below the level of the flared lower end of lift pipe 14.

Turning again to Figure 1, the contact material is lifted through pipe 14 into the hopper 10 wherein it settles due to the lower gas velocity therein. The separated steam passes via conduit 16 to the barometric condenser 130 wherein it is condensed by contact with water, thereby drawing the vacuum on hopper 10. The water and condensed steam leave the condenser 130 via barometric leg 134. Since an atmosphere of steam is maintained within the lower section of the feed tank, very little non-condensed gas enters the lift gas stream, but any non-condensible gas which is sucked into the system may be withdrawn from the barometric condenser by a small compressor or an ejector 133. The vacuum maintained within the hopper 10 should be great enough to accomplish the lifting of contact material through pipe 14 and to overcome the pressure drop through pipe 14. In general, the pressure drop across pipe 14 may be of the order of 3 to 12 pounds per square inch depending upon the rate of contact material flow, its density in the lift pipe, the length of the lift pipe, and the rate of gas flow. In order to provide proper control of the lift operation, the vacuum in chamber 10 should be maintained constant. A convenient method for accomplishing this is to introduce a small amount of non-condensible gas via pipe 140 into the barometric condenser. The rate of gas flow in pipe 140 is controlled by valve 141 and pressure control intrument 142 to maintain constant the vacuum in hopper 10.

The contact material level is maintained constant in separator 10 by permitting a small portion of the circulation to overflow into funnel 200 from which it passes via pipes 201 and 300 into the top of an accumulator 204. The contact material maintains itself within a relatively narrow range of levels within the lower portion of the accumulator and these levels are measured by level indicator 301. A small amount of contact material attrition results from the continuous circulation to the cyclic system. Fine material may be removed from the system by passing a portion of the contact material via pipes 201 and 305 into an elutriator 202 wherein it is scrubbed clean of fines by an upwardly moving gas stream. The gas containing fines is passed to separator 203 wherein the fines are separated. The scrubbed granular material settles into the accumulator 204 from which it flows via pipe 205 to the lift feed tank 13.

In order to avoid excessive fluctuations in the operation of the barometric condenser and also in order to insure proper separation of contact material and gas in hopper 10, it is desirable to maintain constant the total rate of gas flow in pipe 14 irrespective of the rate of contact material circulation. Also, it has been found desirable to maintain the linear gas velocity in the lift pipe within a relatively narrow optimum rate range in order to accomplish the contact material transfer with a minimum of attrition loss. It has been found that this can be accomplished by controlling the total rate of steam flow substantially constant through control valve 119. The rate of contact material flow into the lift pipe is controlled by adjusting the rate of gas flow in pipes 112 or 113 or both, which are fed from pipe 116. Any adjustment in the rate of gas flow through pipe 116 is compensated for by a substantially equal and opposite adjustment in the rate of flow through pipe 107. This can be accomplished by means of the three-way valve 117 or by other suitable means. While the preferred form of this invention involves the use of a suction type lift to transfer contact material from within the bed in the feed tank to the supply hopper, it is to be understood that the specific method of accomplishing contact material introduction into the gas lift stream and for controlling its rate of flow which is described hereinabove is not considered as limited to suction-type lifts but may be employed where the supply hopper is maintained at a pressure near atmospheric while the lift gas is supplied to the lower end of the lift under sufficient pressure to accomplish the contact material transfer. The application of suction type lifts in systems of the type herein involved is the subject of claims in co-pending application Serial Number 75,642, filed in the United States Patent Office on February 10, 1949.

According to the preferred form of this invention, the convertor is positioned a short distance above the reconditioner and the reconditioner is positioned near ground level, while the relatively small supply hopper is positioned a substantial distance above the convertor. This permits all of the large vessels to be located near ground level with a consequent saving in structural steel cost. It is desirable to maintain the pressure in the reconditioner not substantially above that in the convertor so that very little contact material leg height is required to effect gravity flow between the vessels. This may be accomplished by means of the diagram operated valve 160 on stack 89 and differential pressure controller 161. It will be noted that since the tank 13 is maintained near atmospheric pressure, the pipes 92 and 93 may also be relatively short in length so that essentially all of the gravity feed leg height in the system is localized in the legs 17 and 18. It will be aparent that a continuous uninterrupted compact stream of contact material extends down from hopper 10 through legs 17 and 18 and pipes 27 and 28 to the column 40 in the convertor and from the column 40 through pipes 49 and 50 to the column 79 in the reconditioner and then from the reconditioner through pipes 92 and 93 onto the compact bed 102 in the feed tank 13. The rate of solid flow down through this entire system is subject to adjustment solely by the rate of contact material entry from within bed 102 into the lift pipe 14 and this in turn is controlled by regulation of the rate of gas flow from distributors 110 or 111 across the bed 102. It should be understood, however, that the particular method described herein for controlling the rate of contact material introduction into the gas lift while maintaining substantially constant the total gas velocity in the lift pipe is not to be construed as limited in its application to the particular arrangement for the relative positioning of the convertor and reconditioner described hereinabove. In some arrangements, the vessels may be positioned side by side and two separate gas lifts may be employed. Also, while it is preferred to employ steam as the lift gas, it is anticipated that other suitable condensible gases may be substituted therefore. In some operations, the gas supplied to the feed tank and sucked into the lift pipe may be a non-condensible gas in which event the barometric condenser may be replaced by a vacuum pump or other suitable apparatus for evacuating the separator 10.

As an example of the operation of the method and apparatus of this invention, its application to a catalytic cracking process using 4–20 mesh (Tyler) bead form synthetic silica alumina catalyst may be considered. In a typical operation the supply hopper 10 is positioned 185 feet above ground level and is maintained under a vacuum of about 7 pounds per square inch. This vacuum is maintained substantially constant by adjustment of the operation of the barometric condenser 130. Air or flue gas may be introduced via pipe 140 into the condenser for this purpose. Catalyst at about 1100° F. passes down through pipes 17 and 18 to the reactor wherein it contacts a reduced crude petroleum charge supplied via pipes 36 and 37. Vaporized gas oil charge is supplied via conduit 41. The upper section of the reactor is maintained under a pressure of about 10 pounds per square inch while the steam pressure in hoppers 19 and 20 is maintained about a half pound higher. The vertical distance between the bottom of hopper 10 and seal hoppers 19 and 20 is about 90 feet. The legs 21 and 22 are only a few feet long. Spent catalyst passes from the convertor to the kiln via legs 49 and 50 which are only about 6 feet long. The convertor outlet pressure is about 7 pounds per square inch gauge and the pressure in stack 89 may be maintained at about 6 pounds gauge. If desired, the stack pressure may be permitted to drop to substantially atmospheric but should not be permitted to rise substantially above that in the convertor because this would require an increase in the length of gravity flow legs 49 and 50 and consequently an undesirable increase in the overall height of the entire unit. Catalyst is regenerated in the kiln by contaminant burning and the catalyst temperature is controlled below about 1200° F. by the single set of cooling tubes 95. The catalyst rate of circulation is maintained at about 2.5 to 4.5 parts of catalyst by weight per part of oil charge to the reactor and the total oil charge space velocity is of the order of 1.0 to 2.0 volumes of oil per hour measured at 60° F. per volume of catalyst in the reactor. Under these conditions the catalyst may be regenerated without its temperature rising to a heat damaging level by employing cooling tubes at only one or two stages in the lower section of the regeneration kiln. Regenerated catalyst passes as a compact stream from the kiln to lift feed tank 13, the distance between the bottom of the kiln and the top of the lift tank being only about 6 feet. When a suction lift is provided, the pressure within the upper part of tank 13 is substantially atmospheric and that in the lower section of the tank near the entrance to the lift pipe may be controlled anywhere within a range of several pounds vacuum to one or two pounds gauge pressure. The bed depth above the lower end of the lift pipe should be of the order of about 3–8 feet. The level of gas inlets 112 and 113 to feed tank 13 should be preferably within one to two feet of the level of the flared lower end of the lift pipe 14, although the secondary gas may be supplied entirely at a point above the bed in the feed tank in less preferred arrangements. Steam is admitted to the lift tank 13 from conduits 107 and 116, the ratio of feeder steam to that introduced directly into the lift pipe being controlled to maintain the catalyst circulation at the desired rate. For a circulation of about 60 tons per hour in which catalyst is lifted about 180 feet a ten inch diameter lift pipe is adequate and the low pressure waste steam required for the lifting totals about 40 to 50 pounds per minute for a granular catalyst having a packed density of about 45 pounds per cubic foot. It will be noted that by the method of this invention the first stream of lift gas is supplied to the lift pipe without having passed through any substantial depth of contact material bed. The linear velocity of this gas stream as it enters the lower end of the lift pipe should be not greatly in excess of the mixed gas stream velocity in the lift pipe thereabove. In general, the linear velocity of the first gas stream should fall at least within the range 0.5 to 2.0 of the maximum linear velocity of the mixed gas stream in the lift pipe above the flared lower end thereof. The gas and catalyst velocity in the annular passage 106 of Figure 4 or as it flows around the lower end of pipe 14 in Figure 6 should not be substantially greater than it is in the lift pipe shortly above the flared lower end thereof. Thus, the extremely high gas velocity encountered in the feed region of the prior art "jet-fed lifts" is avoided by the method of this invention. Moreover, since the first gas stream enters directly into the lift pipe without having passed through any substantial portion of the contact material bed, the contact material stream turbulence and high flow velocity encountered in gas lift systems heretofore employed is avoided. In many operations this first gas stream may constitute the major portion of the total gas supplied to the lift pipe.

In general, the proper gas velocity to be maintained within the lift pipe varies depending on the particular gas and contact material involved, the pressure and temperature in the lift pipe, and the length of the lift. In general, the linear velocity of the gas flow up through the lift pipe should be within the range about 3 to 60 feet per second and preferably 10 to 40 feet per second above the terminal velocity of the contact material particles. As an example, in a suction type lift in which air at about 900° F. is the lift gas, and in which the contact material was a spherical bead form synthetic silica-alumina catalyst of about 4 to 20 mesh Tyler size and 45 pounds per cubic foot packed density, the linear gas velocity in the lift pipe should be within the range about 85 to 130 feet per second and preferably 90 to 100 feet per second while the catalyst linear velocity is within the range about 10 to 50 feet per second and preferably within the range 10 to 20 feet per second, and the lift pressure was 7.7 and 14.7 pounds per square inch absolute at its upper and lower ends respectively. Under the above conditions, a lift pipe having an internal diameter of about 14 inches and a height of 180 feet can satisfactorily handle about 95 tons per hour of contact material. The relative amounts of feeder gas and of lift gas supplied directly into the lift pipe will vary depending upon the rate of contact material transfer and the size of the gap between the first stream inlet and the lower end of the lift pipe. In general, the feeder stream may amount to from about 5 to 90 percent and preferably from 10 to 65 percent of the total gas supplied to the lift pipe. The rate of feeder gas flow should in all cases be below that which would cause "dusting" or "boiling" of the contact material bed. For reasons discussed hereinabove, it is preferable to set the total gas rate at a constant value and to compensate any change in the rate of flow of the feeder gas stream by an equal and opposite change in the other stream entering from conduit 107 directly into the lift pipe. It is also contemplated within the broader scope of this invention that the rate of catalyst entry to the lift pipe may be controlled by adjusting the rate of flow of gas supplied via pipes 112 or 113 or both while the stream entering via pipe 107 is simultaneously adjusted if necessary to maintain the catalyst density in the lift pipe within the range about 3 to 24 pounds per cubic foot and preferably within the range 4 to 10 pounds per cubic foot on the basis of a catalyst having a normal packed density of about 45 pounds per cubic foot.

It should be understood that the particular details of apparatus design and operation conditions and the particular examples of the application of this invention given hereinabove are intended as illustrative and are not to be construed as limiting the scope of this invention except as it is limited by the following claims.

I claim:

1. In a continuous process for conversion of hydrocarbons wherein a granular contact material is passed cyclically through two contacting zones, one being a confined conversion zone in which it contacts a fluid hydrocarbon to effect conversion thereof to gasiform products, and the other contacting zone being a confined reconditioning zone in which the contact material is subjected to a suitable reconditioning gas to recondition it for reuse in said conversion zone the improved method of transferring the contact material from one of said contacting zones to the other which comprises, passing the contact material downwardly from one of said contacting zones onto a substantially compact bed of said contact material maintained therebelow in a confined zone, maintaining a confined lift passage extending upwardly from an intermediate location in said bed to a location above the other contacting zone, said passage being in communication on its downwardly facing lower end with said bed, supplying a first stream of lift gas into said confined zone so that it may enter the lower end of said lift passage without having passed the gas through any substantial portion of the substantially compact bed, introducing a second stream of lift gas into said bed a spaced distance away from the lower end of said lift passage and flowing it through the intervening portion of said bed into the lower end of said lift passage, thereby inducing contact material from within said bed to flow into said first stream, lifting the contact material suspended in the mixed gas streams upwardly through said lift passage to said location above said other contacting zone and flowing it from said location to said other contacting zone and controlling the rate of contact material entry into said lift passage by controlling the rate of introduction into said bed of said second stream of lift gas, the rate of introduction of said second stream being changed without an accompanying change in the rate of supply of said first stream in the same direction whenever it is desired to change the rate of contact material entry into said lift passage.

2. An improved method for feeding granular solid material into an upwardly extending lift passage through which it is lifted by a lift gas to an elevated receiving zone which method comprises, maintaining a substantially compact bed of said solid material surrounding the lower end of said lift passage and in communication with the interior of said passage along the downwardly facing lower end of said lift passage, supplying the contact material continuously onto the surface of said bed, supplying a first stream of lift gas to the lower end of said lift passage without causing said gas to flow through any substantial thickness of said bed, introducing a second stream of lift gas into said bed at at least one point spaced a substantial distance away from the lower end of said passage and passing said gas through the intervening portion of said bed and then into the lower end of said lift passage at a rate sufficient to push the solid material into said first stream of gas, whereby it becomes suspended in the stream of mixed gas in said lift passage and controlling the rate of solid material entry from said compact bed into said passage by adjusting the rate of introduction of said second stream of gas, while effecting a compensating substantially equal and opposite adjustment in the rate of supply of said first gas stream so as to maintain the total gas flow in said lift passage substantially constant, and maintaining the linear velocities of said first and second streams of lift gas as they enter the lift passage not greatly in excess of the linear velocity of the mixed gases thereabove in the lift passage.

3. In a cyclic process for the conversion of hydrocarbons in the presence of a moving granular solid material wherein the solid material is passed cyclically through two contacting zones, one being a conversion zone wherein it is contacted with fluid hydrocarbons undergoing reaction and the other being a reconditioning zone wherein it is contacted with a suitable reconditioning gas to recondition it for reuse in said conversion zone, the improved method of transferring the contact material from one of said zones to the other which comprises, passing solid material from one of said contacting zones onto a substantially compact bed of said solid material in a lift feeding zone, supplying a first stream of lift gas from outside said feeding zone substantially directly to a mixing region within said bed substantially below its surface, passing a control stream of gas through a portion of said bed towards said mixing region and then permitting the control stream to enter and mix with said first gas stream so as to induce solid material from within said bed to enter said mixing region and become suspended in the mixed gas, passing the mixed gas and contact material upwardly as the mixed gas and contact material upwardly as a confined lift stream to a separation zone located above the other of said contacting zones, maintaining the total amount of gas admitted into said lift gas stream at a suitable substantially constant rate suitable for lifting the contact material from said feeding zone to said separation zone, effecting control of the rate of solid material entry into said lift gas stream by adjustment in the rate of flow of said control gas stream, while maintaining constant the total rate of gas flow in said lift gas stream by compensating any adjustment in said control gas stream by an equal and opposite adjustment in the rate of gas admission of said first named stream of gas to the lower end of said gas lift stream, effecting separation of contact material from the lift gas in said separation zone and passing the separated contact material to the other of said contacting zones.

4. In a cyclic process for the conversion of hydrocarbons in the presence of a moving granular solid material wherein the solid material is passed cyclically through two contacting zones, one being a conversion zone wherein it is contacted with fluid hydrocarbons undergoing reaction and the other being a reconditioning zone wherein it is contacted with a suitable reconditioning gas to recondition it for reuse in said conversion zone, the improved method of effecting the circulation of said solid material which comprises: passing solid material from one of said contacting zones onto a substantially compact bed of said solid material in a lift feeding zone, maintaining a confined lift passage extending upwardly from a location in said bed substantially below its surface and above its bottom to a solid-gas separation zone located above the other of said contacting zones, said lift passage having its downwardly facing lower end within said bed at least partially open to allow communication between said bed and said lift passage, introducing a first stream of gas from outside said lift feeding zone into the lower end of said passage without causing said gas to pass through any substantial portion of the bed, introducing a second stream of lift gas into said bed a spaced distance from the lower end of said passage and flowing the gas through the bed and then into the lower end of said passage so as to induce solid material to move into said first stream of gas and become lifted by the mixed gas streams upwardly through said passage and into said separation zone, effecting separation of solid material from the gas in said separation zone, exhausting the gas from said separation zone so as to maintain it under a substantial vacuum sufficient to suck the gas and solid material up through said confined passage, flowing the separated solid material downwardly to the other of said contacting zones, regulating the rate of solid material transfer from said feeding zone to said separation zone by adjusting the rate of introduction of said second gas stream into said bed, and maintaining the total rate of gas flow in said confined passage substantially constant by compensating for any rate adjustment in said second gas stream by an opposite and substantially equal rate adjustment in said first gas stream.

5. In a system for the continuous conversion of hydrocarbons in the presence of a cyclically moving granular contact material having two contacting vessels positioned one above the other, each of said vessels having separate gas inlets and gas outlets spaced apart from the inlets and having solid material inlets at their upper ends and solid material outlets at their lower ends, an unobstructed, vertical conduit for solid flow connecting the solid outlet on the upper vessel to the solid inlet on the lower vessel, the improved system for transfer of contact material from the lower contacting vessel back to the upper contacting vessel comprising a separation vessel positioned a substantial distance above the upper contacting vessel, a vertical feed conduit connecting the lower section of the separation vessel with the solid material inlet on the upper contacting vessel, a gas outlet conduit connected into the separation vessel near its upper end, a receptacle adapted to confine a bed of contact material positioned below the lower contacting vessel, members defining an unobstructed, downwardly extending passage for solid material flow from the bottom of the lower contacting vessel into the upper section of said receptacle, a lift conduit extending upwardly from a location within the lower section of but above the bottom of said receptacle to a location within said separation vessel intermediate the top and bottom thereof, said conduit being open on its upper end and being at least partially open on its lower end, an inlet for gas connecting into said receptacle directly below the lower end of said lift conduit, an externally located gas supply conduit, a three-way valve on said supply conduit, conduit means connecting said gas inlet to said valve, at least one gas inlet pipe connecting into the side of said receptacle at a level near that of the lower end of said lift conduit, conduit means connecting said last named gas inlet to said three-way valve, and a constant flow control device on said supply conduit upstream of said three-way valve.

6. An improved apparatus for pneumatic transfer of granular contact material comprising, a feed chamber adapted to confine a bed of contact material, conduit means to supply contact material into the upper section of said feed chamber, a receiving chamber positioned at a higher level than said feed chamber, a lift pipe extending upwardly to said receiving chamber from a location in said feed chamber below conduit means for contact material supply but above the bottom of said feed chamber, said lift pipe having an outwardly flared, downwardly facing, open lower end, a gas inlet conduit connecting into said feed chamber and terminating directly below said flared open end of said lift pipe, a perforated, upright tapered distributor head on the end of said inlet conduit, said head having a perforated area for gas flow which is not substantially less than the horizontal cross-sectional area of said lift pipe above the level of its flared lower end, and a second gas inlet connecting into said feed chamber at a location spaced a substantial distance away from the lower end of said lift pipe and positioned not substantially below the level thereof, at least one flow control device associated with the first and second named gas inlet conduits adapted to permit adjustment on the flow in one of said conduits and to automatically cause a change in the adjustment on flow in the other of said conduits which is opposite to any adjustment made on the flow in the first conduit.

7. In a continuous process for conversion of hydrocarbons wherein a granular material is passed downwardly through two contacting zones arranged in vertical series, in which zones the contact material flows as a substantially compact column and between which zones it flows as a confined unobstructed compact stream of relatively small cross-sectional area, one of said contacting zones being a reaction zone in which the contact material is contacted with a fluid hydrocarbon reactant to effect conversion thereof and the other of said zones being a reconditioning zone in which the contact material is contacted with a suitable reconditioning gas to recondition it for reuse in said conversion zone, and wherein the contact material flows from the uppermost zone to the lowermost zone as a confined, compact, unthrottled stream of relatively small cross-sectional area, the improved method for effecting cyclic circulation of the contact material through said contacting zones comprising, passing the contact material from the lower of said contacting zones to a substantially compact unobstructed stream onto the surface of a substantially compact bed of said contact material in a lift feeding zone therebelow, said stream being free of flow restriction except for the throttling effect of said bed, introducing a first stream of lift gas into said lift feeding zone and passing it upwardly through at least a portion of said bed and on upwardly to a separation zone located above the upper contacting zone said stream of lift gas being shielded throughout its length from gravity flow of contact material from said bed thereinto but being in communication with said bed at a location below the bed surface and above its bottom, introducing a separate control stream of gas into said lift feeding zone at a location spaced substantially away from the place of communication of said confined lift stream with said bed and separated therefrom, at least when the gas is not flowing by a substantial compact bed mass, causing said second stream to enter said lift stream so as to cause contact material near the place of communication with said confined lift stream to rise into said lift stream, lifting the contact material which enters said lift stream from said bed upwardly into said separation zone located above the uppermost contacting zone, effecting separation of contact material from carrying gas in said separation zone, withdrawing separated gas from the upper section of said separation zone, passing contact material downwardly from the lower section of said separation zone as a substantially compact, vertical stream into the uppermost contacting zone, said compact stream being of sufficient vertical length to insure gravity flow of contact material to said uppermost contacting zone against the pressure therein, and controlling the rate of contact material flow down from said separation zone to and through said contacting zones and to said bed in said feeding zone by adjustment of the rate of supply of said separate control stream of gas into said bed in said lift feeding zone, the rate of contact material circulation being changed when desired by a change in the rate of supply of said separate control stream of gas, accompanied with an opposite change in the rate of introduction of said first mentioned stream of gas so that the total rate of the first and second gas streams remain substantially constant.

8. An improved method for transferring granular contact material from one elevation to a higher elevation which comprises, maintaining a substantially compact bed of said contact material in a feeding zone at the lower elevation, baffling the lower portion of said bed to provide a gas space communicating on its bottom with said bed, supplying a first stream of steam into the lower section of said bed near said gas space and causing it to flow through an intervening portion of said compact bed to said gas space to cause the contact material to rise upwardly from within said bed into said gas space, introducing a second stream of steam into said gas space at a level above its bottom to mix with the rising contact material, sucking the mixed steam and contact material upwardly from said gas space as a confined stream into a settling zone positioned at the higher elevation, effecting separation of the steam and contact material in said settling zone, sucking the steam from the upper section of said settling zone into a barometric condensing zone wherein it is mixed with water to effect its condensation, controlling the rate of steam suction from said separating zone to maintain it under sufficient vacuum to lift the contact material from said bed in said feeding zone to said settling zone, controlling the rate of contact material transfer from said feeding zone to said settling zone by regulating the rate of supply of said first named stream of steam into the lower section of said bed in said lift feeding zone, any change in the rate of supply of said first stream of steam being accompanied by an opposite change in the rate of introduction of said second stream of steam into said gas space, and replenishing said bed as required with contact material.

9. In a cyclic process for the conversion of hydrocarbons wherein a granular contact material is passed downwardly in series as a substantially compact mass through two contacting zones, one of said contacting zones being a reaction zone in which the contact material is contacted with the hydrocarbon reactant and the other zone being a reconditioning zone in which the contact material is contacted with a reconditioning gas, and wherein the contact material flows downwardly from the uppermost zone to the lower contacting zone as a substantialy compact, confined, unobstructed stream, the improved method for transferring the contact material from the lower contacting zone back to the upper contacting zone which comprises, passing the contact material from the lower of said contacting zones as a substantially compact unobstructed stream onto the surface of a substantially compact bed of said contact material in a lift feed zone therebelow, maintaining a confined lift passage extending upwardly from a location within said compact bed intermediate its ends to a location above the upper contacting zone, said passage communicating at its downwardly facing lower end with said bed, supplying a first stream of lift gas to the lower end of said lift passage without causing it to flow through a substantial thickness of said compact bed, introducing a feeder stream of gas into said bed a spaced distance away from the lower end of said lift passage and flowing it through the intervening portion of said compact bed into the lower end of said lift passage, thereby inducing contact material from within said bed to flow into said first stream, lifting the contact material suspended in the mixed first lift gas stream and feeder gas stream upwardly through said lift passage to said location above the upper contacting zone and gravitating the contact material downwardly from said location onto the column in said upper contacting zone, maintaining the linear velocity of the first gas stream as it enters said passage within about 0.5 to 2.0 of the maximum mixed gas velocity along said passage and controlling the rate of contact material entry into said lift passage by adjusting the rate of introduction into said bed of said feeder stream of lift gas, the rate of introduction of said feeder stream of lift gas being changed without any substantial change in the same direction of the rate of supply of said first stream of lift gas when a change in the rate of contact material entry into said lift passage is desired.

10. An improved method for feeding granular solid material into an upwardly extending lift passage through which it is lifted by a lift gas to an elevated receiving zone which method comprises, maintaining a substantially compact bed of said solid material surrounding the lower end of said lift passage and in communication with the interior of said passage along the downwardly facing lower end of said lift passage, supplying the contact material continuously onto the surface of said bed, supplying a first stream of lift gas substantially directly to the lower end of said lift passage, passing a second stream of gas transversely across said bed and then into said passage whereby solid material is caused to enter said first stream and to be lifted by the mixed gas streams up into said supply zone, separating gas from the solid material in said supply zone and withdrawing the separated gas from the upper section of said supply zone, controlling the rate of solid material entry into said lift passage by controlling the rate of flow of said second gas stream, desired changes in the rate of said contact material flow being effected by change in the rate of flow of said second gas stream without corresponding change in the same direction in the rate of said first stream of gas, and maintaining the density of contact material in said confined lift passage within the range 3 to 24 pounds per cubic foot by control of the total rate of supply of both gas streams.

11. An improved apparatus for pneumatic transfer of granular contact material comprising a receptacle adapted for confining a bed of contact material, a separation vessel positioned at a higher level than said receptacle, a gas outlet from the upper section of said separation vessel and a solid material outlet from the lower section of said vessel, a lift conduit extending upwardly from a location within the lower section of but above the bottom of said receptacle to a location within said separation vessel intermediate the top and bottom thereof, said conduit being open on its upper end and having a flared open lower end, a cylindrical gas inlet member attached to the bottom of said receptacle and extending upwardly to a level near the flared lower end of said lift conduit, a conical shaped roof on said inlet member extending upwardly within said flared lower end of said lift conduit, said conical roof being of less lateral dimension than said flared lower end of the lift conduit so as to leave an annular passage for gas and contact material entry between the conical roof and said flared lower end of said lift conduit, openings in said conical roof to permit gas flow from within the inlet member into said gas lift conduit, an externally located gas supply conduit, a constant flow control device on said conduit, a three-way valve on said conduit down stream from said flow control device, a pipe connected between said three-way valve and said cylindrical inlet member, a gas distributing member extending around the inner side wall of said receptacle at a level intermediate its ends, a pipe connected between said distributing member and said three-way valve and a flow control valve on said last named pipe.

12. In a system for conversion of hydrocarbons in the presence of a moving granular contact material, wherein there is provided two contacting vessels positioned one above the other connected by an unobstructed vertical conduit for solid flow, the improved apparatus for transferring the contact material from the lower to the upper contacting vessel which comprises, a separation vessel positioned a substantial distance above the upper contacting vessel, a vertical feed conduit connecting the lower section of the separation vessel with the solid material inlet on the upper contacting vessel, a gas outlet conduit connected into the separation vessel near its upper end, a receptacle adapted to confine a bed of contact material positioned below the lower contacting vessel, members defining an unobstructed, downwardly extending passage for solid material flow from the bottom of the lower contacting vessel into the upper section of said receptacle, a lift conduit extending upwardly from a location within the lower section of but above the bottom of said receptacle to a location within said separation vessel intermediate the top and bottom thereof, said conduit being open on its upper end and being at least partially open on its lower end, passage defining means for gas introduction into the lower end of said lift conduit from a location outside of said receptacle, and conduit means for gas introduction into the lower section of said receptacle at a location spaced apart from the open lower end of said lift conduit, at least one flow control device associated with said passage defining means and conduit means for gas introduction adapted to permit adjustment in the gas flow in said conduit for gas introduction and to automatically provide an adjustment on the flow in said passage defining means which is opposite any adjustment made on the flow in said conduit.

13. In a continuous process for conversion of hydrocarbons wherein a granular contact material is passed cyclically through two contacting zones, one being a confined conversion zone in which is contacts a fluid hydrocarbon to effect conversion thereof to gasiform products, and the other contacting zone being a confined reconditioning zone in which the contact material is subjected to a suitable reconditioning gas to recondition it for reuse in said conversion zone the improved method of transferring the contact material from one of said contacting zones to the other which comprises, passing the contact material downwardly from one of said contacting zones onto a substantially compact bed of contact material maintained in a separate feeding zone therebelow, replenishing the other contact zone from a supply zone positioned thereabove and above said feeding zone, maintaining communication between said supply zone and said feeding zone through an upright confined passage which opens on its upper end into said supply zone and which opens on its downwardly facing lower end to said bed at a location under the surface thereof, supplying a first stream of gas to the lower end of said confined passage without its having passed through a substantial portion of said bed in contact with the contact material, introducing a feeder stream of gas into said feeding zone at a location spaced substantially away from the lower end of said passage and by a portion of said compact bed, passing said feeder stream through the intervening portion of said zone without substantial bailing of said compact bed into the lower end of said confined passage so as to cause contact material to enter said confined passage, passing the contact material suspended in the mixed gas streams up through said passage to said supply zone and adjusting the rate of flow of said feeder gas stream to control the rate of transfer of contact material through said confined passage at the desired rate, and avoiding substantial change in the rate of total gas supply by accompanying any adjustment in the rate of said feeder gas by an opposite adjustment in the rate of said first gas stream.

14. An improved method for feeding granular solid material into an upwardly extending lift passage through which it is lifted by a lift gas from a confined feeding zone to an elevated receiving zone which method comprises, maintaining a substantially compact bed of said solid material in said feeding zone surrounding the lower end of said lift passage and in communication with the interior of said passage along the downwardly facing lower end of said lift passage, supplying the contact material continuously onto the surface of said bed, supplying a first stream of lift gas to the lower end of said lift passage without causing said gas to flow through any substantial thickness of said bed introducing a second stream of lift gas into said feeding zone at a location spaced away from the lower end of said lift passage and separated therefrom, at least when the gas flow is stopped by a portion of said compact bed, passing said second stream of gas through the intervening portion of said feeding zone to the lower end of said lift passage, whereby contact material from said bed is forced to enter said lift passage and become suspended in the stream of mixed gas in said lift passage and controlling the rate of solid material entry into said lift passage and the volumetric rate of solid material transfer to said receiving zone by adjustment of the rate of introduction of said second stream of lift gas, the rate of said second stream of lift gas being increased when an increase in solid material transfer is desired and decreased when a decrease in solid material transfer is desired, and accompanying any such adjustment in said second stream by an opposite adjustment on the flow of said first stream of gas.

15. An improved apparatus for pneumatic transfer of granular contact material comprising, a feed chamber adapted to confine a bed of contact material, conduit means to supply contact material into the upper section of said feed chamber, a receiving chamber positioned at a higher level than said feed chamber, a lift pipe extending upwardly to said receiving chamber from a location within the lower section of but above the bottom of said feed chamber, said lift communicating with the interior of said feed chamber through its downwardly facing open lower end, an inlet for gas connected into said feed chamber and having its delivery end adjacent the lower end of said lift pipe and separate conduit inlet means for gas introduction connected into the lower section of said feed chamber at a location spaced apart from the open lower end of said lift pipe, and at least one flow control device associated with the first and second named gas inlets to said feed chamber adapted to permit adjustment on the gas flow through the second mentioned inlet means and to cause a compensating reverse adjustment in gas flow through the first mentioned inlet whenever an adjustment is made on the gas flow through the second mentioned inlet means.

ERIC V. BERGSTROM.

References Cited in the file of this patent

UNITED STATES PATENTS

| Number | Name | Date |
|---|---|---|
| 168,029 | Korting | Sept. 21, 1875 |
| 2,331,433 | Simpson et al. | Oct. 12, 1943 |
| 2,438,261 | Utterback | Mar. 23, 1948 |
| 2,440,475 | Jacomini | Apr. 27, 1948 |
| 2,561,771 | Ardern | July 24, 1951 |

OTHER REFERENCES

"Petroleum Refiner," vol. 28, No. 1, pages 110 to 112 (January 1949).